Patented Feb. 22, 1944

2,342,574

UNITED STATES PATENT OFFICE 2,342,574

LIGHTWEIGHT MINERAL MATERIAL

Paul S. Denning, Joliet, Ill., assignor to F. E. Schundler & Co., Inc., Joliet, Ill., a corporation of Illinois No Drawing. Application October 9, 1939, Serial No. 298,618. In Canada October 11, 1938

1 Claim. (Cl. 106—110)

This invention relates to lightweight granular aggregates and, among other objects, aims to produce a strong mineral aggregate of lighter weight than heretofore and having a relatively low water absorption.

The nature of the invention may be readily understood by reference to one illustrative embodiment thereof described in the following specification.

Lightweight mineral materials, such as exfoliated vermiculite, are generally too fragile and weak to function as aggregates in concrete and other cementitious materials. Furthermore, because of their porosity, they absorb excessive quantities of water, thereby weakening the resulting cement and greatly prolonging the time required for drying.

Exfoliated vermiculite is one example of a lightweight mineral material whose qualities are substantially impaired when subjected to rough handling, such as is involved in the preparation of lightweight concrete. Exfoliated vermiculite is an alteration product of certain micaceous materials of the biotite type, which exfoliate or expand to many times their original size upon the application of heat, to produce a lightweight granular material which possesses a high insulating efficiency. It comprises numerous highly polished laminae which separate slightly upon exfoliation. It is semi-plastic or compressible in a direction perpendicular to the laminae and tends to split along the cleavage planes when subjected to severe handling. Because of the multitude of minute capillary spaces between its laminae, it is capable of absorbing tremendous amounts of water which excessively prolong drying time and so greatly increase the water cement ratio in a cementitious mixture as to weaken it materially. Otherwise its light weight and other qualities make it an ideal lightweight aggregate in concrete and other cementitious materials. Its mineral nature makes it stable in the presence of moisture and other decomposing forces. The numerous polished laminae maintain its insulating efficiency at high temperatures against radiant heat.

I have discovered that exfoliated vermiculite, lightweight slag, and other friable or soft lightweight mineral aggregates may be treated to prevent substantial water absorption and toughened adequately without objectionable increase in weight or loss of insulating efficiency, by application of a reinforcing coating to the exterior of the granules. The coating in the present instance is in the form of an insoluble and impervious mineral glaze or the like. According to the present process, as applied to exfoliated vermiculite for example, the granules are mixed with a liquid coating forming material and then dried to cause the water to evaporate, thereby to effect a migration of the coating forming material to, and concentration thereof at, the surface of the granules. Thereupon the granules are heated to high temperatures to convert the coating forming material into a hard, insoluble and impervious shell or glaze.

Liquid sodium silicate may advantageously be used as a coating forming material. It is mixed with the particles of exfoliated vermiculite so as thoroughly to coat them. I have found sodium silicate of from 35° to 42° Bé. and having a soda to silica ratio of about 1 to 3¼ quite satisfactory. A relatively high silica content is desired to improve the strength of the glaze. Sodium silicate of this type is similar to that sold on the market as "N" brand by Philadelphia Quartz Co.

After application of the coating forming material, the particles are dried, preferably under heat, to evaporate the water from the coating material, e. g. sodium silicate, thereby to cause the residue to travel with the water to and concentrate at the surface of the particles. The steps necessary to prepare the material for drying and subsequent treatment depend somewhat on the character of vermiculite employed. If granules of so-called plaster size (made from crude vermiculite of −10 to +28 mesh) and larger be employed, they do not tend to adhere firmly together (particularly if the mass is merely dampened with sodium silicate solution of about 38° Bé. and not rendered soggy), and ordinary handling in the drying and subsequent treatments is sufficient to prevent clustering or conglomeration of the granules.

It is not essential, however, to employ sized granules. So-called fines, ordinarily a waste material comprising dust and a multitude of thin flakes and laminae, may be satisfactorily employed by mixing the material with liquid sodium silicate into a dough-like pulp and thereafter subdividing it into particles of the desired size. For this purpose a larger portion of sodium silicate, preferably of lower concentration (40° to 42° Bé.), is employed. After thorough mixing the dough-like mass may be subdivided by passing the material through a screen whose mesh determines the size of the particles. The sodium silicate initially has sufficient binding action to prevent disintegration of the sized particles during subsequent treatment.

After drying of the granules of the sized particles (made from the pulp) to concentrate the sodium silicate at the surface, they are subjected to temperatures of about 1200° to 1400° F. to convert the silicate into an insoluble coating or glaze which when cool and hard both reinforces the granules to enable them to withstand rough treatment without crushing or disintegration and renders them substantially incapable of water absorption. Exfoliated vermiculite granules thus treated weigh about 9 to 15 pounds per cubic foot, depending on the screen size, and in relation to their strength are the lightest known aggregate.

Drying and substantial heating to high temperatures may advantageously be performed in a continuous process by introducing the granules coated with the sodium silicate into one end of an elongated rotary tube inclined at such an angle as to cause the granules to roll and tumble and travel downwardly through the tube. The lower end of the tube is heated to about 1400° and is preferably partly insulated to prevent rapid cooling of the tube and instead to create a gradual reduction in temperatures to about 350° F. at the entrance end of the tube. If the tube be about 30 feet long and be given a gradual inclination, the granules will remain in the low temperature upper end of the tube a sufficiently long time to dry and cause migration of the coating material to the surface of the granules before they reach the zone of 1200° F., at which conversion of the sodium silicate into insoluble form commences.

The tumbling action which takes place in the tube rounds the particles formed from fines into a roughly spherical pellet and also tends to cause minute flakes and laminae to form an external shell entirely around the particles, which in conjunction with the hard glaze or coating very materially adds to the strength of the pellets.

Other glazing agents referred to in the ceramic trades as "borons," such as salt cake, i. e., sodium sulphate, which flux under heat to form a glaze, may be used in place of sodium silicate. If the glazing agent used have insufficient temporary bonding power during the sizing and subsequent operations (where the pellets are formed from finer material) supplementary organic bonding material, such as dextrine or pitch liquor may be employed. The supplementary bonding agents are, of course, destroyed at the high temperatures reached but are sufficient to carry the material to the fusion zone of the glazing agents.

Lightweight materials thus formed have many important uses. As aggregates for insulating and light weight concrete, their low water absorption power permits the formation of a plastic mixture with a minimum water to cement ratio, thereby greatly increasing the strength of the cement as well as reducing its drying time. The plaster size and finer granules may be used wholly or partly in place of sand to form an insulating plaster which has substantially the same trowelling properties (due to the low water absorption of the granules) as ordinary sand and plaster, and the same drying time as the latter. When used as an aggregate in the formation of plaster board (wherein gypsum is used as the cementitious ingredient) the decrease in the amount of water used to secure an adequately plastic mass, greatly reduces the drying costs and the drying time of the board and correspondingly increases the capacity of a plant, since drying capacity is usually the limiting factor in the manufacture of plaster board and the like.

Obviously the invention is not limited to the details of the illustrative embodiment herein described since these may be variously modified. Moreover it is not indispensable that all features of the invention be used conjointly since various features may be used to advantage in different combinations and subcombinations.

Having described my invention, I claim:

A plaster board having a core comprising in combination gypsum plaster, an aggregate of small granules of exfoliated vermiculite coated with an insoluble sealing coating to reduce the water absorption of the granules.

PAUL S. DENNING.